(12) United States Patent
Baker et al.

(10) Patent No.: US 7,752,333 B1
(45) Date of Patent: Jul. 6, 2010

(54) METHODS AND APPARATUS FOR LOCAL NETWORK ADDRESS ACQUISITION, ANALYSIS AND SUBSTITUTION

(75) Inventors: Albert D. Baker, Lincroft, NJ (US); Richard Kwokchiu Lau, Red Bank, NJ (US)

(73) Assignee: Avaya Inc., Basking Ridge, NJ (US)

( * ) Notice: Subject to any disclaimer, the term of this patent is extended or adjusted under 35 U.S.C. 154(b) by 865 days.

(21) Appl. No.: 09/484,098

(22) Filed: Jan. 18, 2000

(51) Int. Cl.
*G06F 15/16* (2006.01)
*G06F 15/173* (2006.01)
*H04L 12/28* (2006.01)

(52) U.S. Cl. ............... 709/244; 709/245; 709/242; 709/228; 370/395.31; 370/395.54; 370/401

(58) Field of Classification Search ......... 709/244–245, 709/228, 250, 249, 241, 238, 239, 223, 220, 709/235, 242; 370/399, 401, 395.31, 395.54
See application file for complete search history.

(56) References Cited

U.S. PATENT DOCUMENTS

| | | | | |
|---|---|---|---|---|
| 5,526,489 | A * | 6/1996 | Nilakantan et al. | 709/228 |
| 5,856,974 | A * | 1/1999 | Gervais et al. | 370/392 |
| 5,922,049 | A * | 7/1999 | Radia et al. | 709/220 |
| 6,006,272 | A * | 12/1999 | Aravamudan et al. | 709/245 |
| 6,070,187 | A * | 5/2000 | Subramaniam et al. | 709/220 |
| 6,088,725 | A * | 7/2000 | Kondo et al. | 709/220 |
| 6,101,189 | A * | 8/2000 | Tsuruoka | 370/401 |
| 6,128,664 | A * | 10/2000 | Yanagidate et al. | 709/228 |
| 6,141,690 | A * | 10/2000 | Weiman | 709/245 |
| 6,157,950 | A * | 12/2000 | Krishnan | 709/245 |
| 6,222,842 | B1 * | 4/2001 | Sasyan et al. | 370/397 |
| 6,249,801 | B1 * | 6/2001 | Zisapel et al. | 709/105 |
| 6,295,276 | B1 * | 9/2001 | Datta et al. | 709/203 |
| 6,366,558 | B1 * | 4/2002 | Howes et al. | 370/219 |
| 6,377,987 | B1 * | 4/2002 | Kracht | 709/220 |

(Continued)

OTHER PUBLICATIONS

Rekhter et al, RFC 1597, www.ietf.org/rfc/, Mar. 1994, pp. 1-8.*

(Continued)

*Primary Examiner*—Ario Etienne
*Assistant Examiner*—Gregory G Todd
(74) *Attorney, Agent, or Firm*—Joseph B. Ryan; Jason Paul DeMont; Wayne S. Breyer

(57) ABSTRACT

A local network is interfaced with one or more external network elements via a gateway that implements an address substitution mechanism for ensuring that communications between devices attached to the local network are not routed through an external network as a result of, e.g., disparity in their remotely-assigned Internet protocol (IP) addresses. In accordance with the invention, the gateway is configured to intercept communications from devices on the local network in order to determine remotely-assigned IP address information for those devices. After such information is determined for a given device, the gateway creates a set of address substitution information that includes sub-network compatible addresses for use by other devices on the local network when communicating with the given device. Advantageously, the created address substitution information when utilized by the other devices on the local network to communicate with the given device ensures that such communications are not routed outside the local network regardless of IP address disparity between the devices.

21 Claims, 2 Drawing Sheets

U.S. PATENT DOCUMENTS

| | | | |
|---|---|---|---|
| 6,378,000 B1 * | 4/2002 | Akatsu et al. | 709/245 |
| 6,414,952 B2 * | 7/2002 | Foley | 370/352 |
| 6,434,627 B1 * | 8/2002 | Millet et al. | 709/245 |
| 6,519,243 B1 * | 2/2003 | Nonaka et al. | 709/230 |
| H2065 H * | 5/2003 | Hong et al. | 709/226 |
| 6,674,745 B1 * | 1/2004 | Schuster et al. | 370/352 |
| 6,693,878 B1 * | 2/2004 | Daruwalla et al. | 370/235 |
| 6,765,920 B1 * | 7/2004 | Tari et al. | 370/401 |
| 6,768,743 B1 * | 7/2004 | Borella et al. | 370/401 |
| 6,807,166 B1 * | 10/2004 | Ohura | 370/352 |
| 7,120,139 B1 * | 10/2006 | Kung et al. | 370/352 |
| 2002/0152311 A1 * | 10/2002 | Veltman et al. | 709/227 |

OTHER PUBLICATIONS

J. Bound et al., "Dynamic Host Configuration Protocol for IPv6 (DHCPv6)," www.ietf.org, 54 pages, Nov. 2000.

S. Cheshire, "Dynamic Configuration of IPv4 Link-Local Addresses," www.ietf.org, 13 pages, Nov. 2000.

R.B. Hibbs et al., "Dynamic Host Configuration Protocol (DHCP) Server MIB," www.ietf.org, 35 pages, Nov. 2000.

* cited by examiner

METHODS AND APPARATUS FOR LOCAL NETWORK ADDRESS ACQUISITION, ANALYSIS AND SUBSTITUTION

FIELD OF THE INVENTION

The present invention relates generally to communication networks, such as networks including asynchronous transfer mode (ATM) connections or asymmetric digital subscriber loop (ADSL) connections, and more particularly to techniques for addressing computers and other devices in such networks.

BACKGROUND OF THE INVENTION

Local networks are often connected to external networks via a bidirectional routing device commonly referred to as a gateway. In a local networking arrangement of this type with external network attachments, e.g., attachments provided through the local gateway, endpoints of the local network are typically assigned Internet Protocol (IP) addresses by a remote server in accordance with the well-known Dynamic Host Configuration Protocol (DHCP). DHCP dynamically allocates IP addresses to computers on a local network. For example, a range of IP addresses may be assigned to DHCP, such that each computer or other device on the local network can have its Transmission Control Protocol (TCP)/IP software configured to request an IP address from a remote DHCP server. The request and grant process uses a lease concept with a controllable time period.

A significant problem with the above-described type of conventional address assignment arrangement is that there is no guarantee that different endpoints on the same physical local network, e.g., different endpoints on the same local area network (LAN), will be assigned compatible subnetwork addresses.

This IP addressing disparity prevents local network utilities, e.g., a Network Neighborhood utility, from identifying locally available resources, such as computers, printers, file servers or other devices attached to the same LAN. Instead, this conventional addressing arrangement requires that such devices be treated as remote devices. As a result, the local gateway is generally required to route communications between different devices on the same LAN through an external network, e.g., an external public switched telephone network (PSTN) or asynchronous transfer mode (ATM) network. For example, as a result of the conventional IP addressing arrangement, a personal computer attached to a given LAN which sends a message to a printer attached to the same LAN may have to route the message out through the gateway into the external network, from which the message will be directed back through the gateway to the printer. It is apparent that this type of communication unnecessarily consumes gateway and external network processing resources.

SUMMARY OF THE INVENTION

The invention provides techniques for providing local network services in an environment in which, e.g., local Internet Protocol (IP) addresses have been assigned by a remote server and therefore have disparate subnetwork addresses.

In accordance with the invention, a local area network (LAN) or other type of local network is interfaced with one or more external network elements via a gateway that implements an address substitution mechanism for ensuring that communications between devices attached to the local network are not routed through an external network as a result of, e.g., disparity in their remotely-assigned IP addresses. In accordance with the invention, the gateway is configured to intercept communications from devices on the local network in order to determine remotely-assigned IP address information for those devices. After such information is determined for a given device, the gateway creates a set of address substitution information that includes sub-network compatible addresses for use by other devices on the local network when communicating with the given device. The substitution addresses are then used in subsequent communications between the devices on the local network.

Advantageously, the invention prevents traffic between devices on the same local network from being routed through an external network as a result of IP address disparity. Although the above-described illustrative embodiment is particularly well suited for use in transmission applications involving external asynchronous transfer mode (ATM) transmitted over asymmetric digital subscriber loop (ADSL) network connections, the invention can also be implemented in other types of communication systems including, for example, Frame Relay systems, IP systems, etc. These and other features and advantages of the present invention will become more apparent from the accompanying drawings and the following detailed description.

DETAILED DESCRIPTION OF THE INVENTION

The present invention will be illustrated below in conjunction with an exemplary communication system which provides connections between a local area network (LAN) and one or more external networks via a gateway. It should be understood, however, that the disclosed techniques are suitable for use with a wide variety of other types of systems including, for example, Frame Relay systems and IP systems, and with any desired type of communication medium, including asymmetric digital subscriber loop (ADSL), synchronous optical network (Sonet)/synchronous digital hierarchy (SDH), wireless networks, etc. The term "local network" as used herein in intended to include any type of network which may be interfaced via a gateway device to one or more external network elements. A local network in accordance with the invention may therefore include, e.g., a local area network (LAN), wide area network (WAN), metropolitan area network (MAN), extranet, or intranet, as well as portions or combinations of these and other networks.

Figure 1:
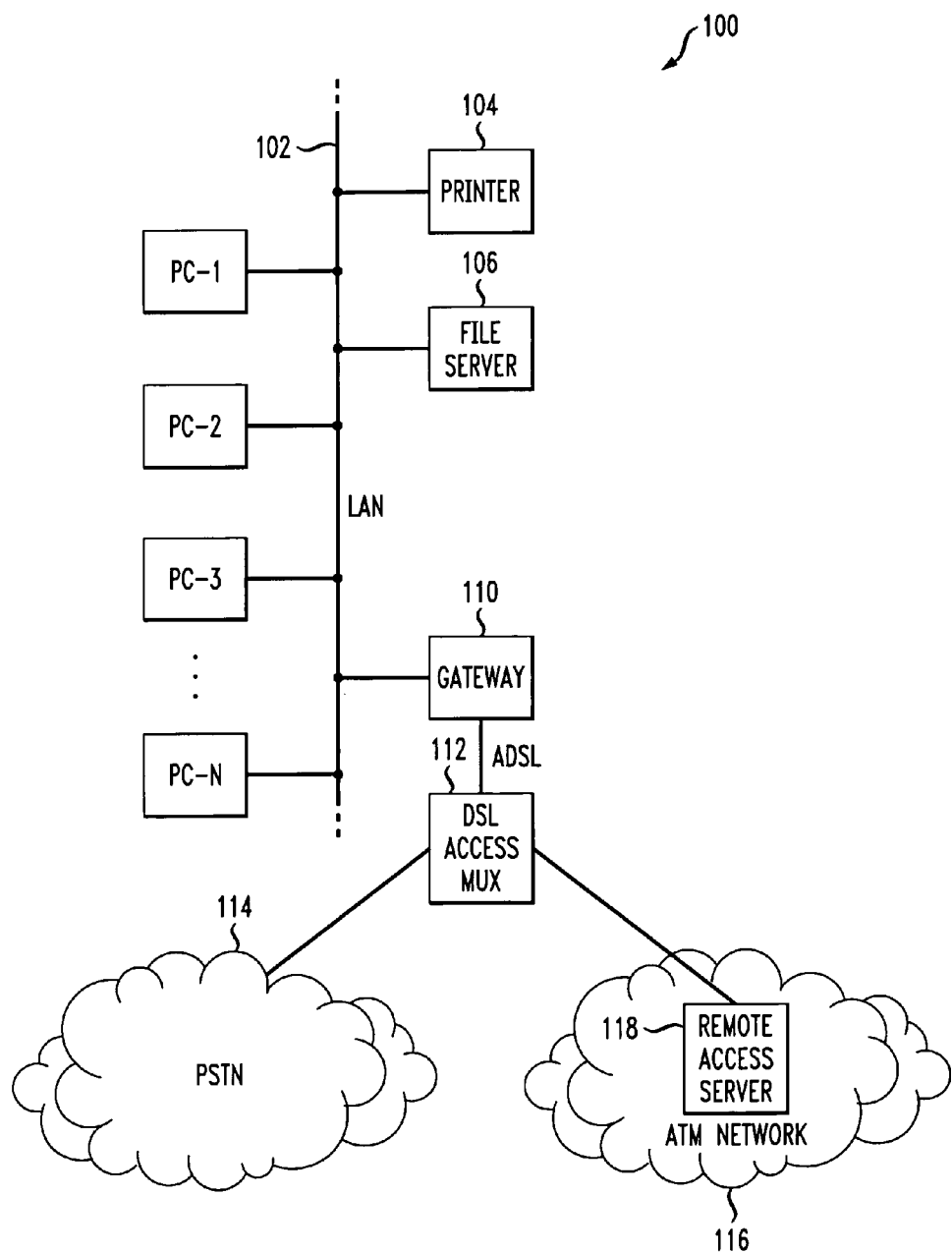
FIG. 1 is a block diagram of an exemplary communication system in which the invention may be implemented.

FIG. 1 shows a portion of a communication system 100 in accordance with an illustrative embodiment of the invention. The system 100 includes a local area network (LAN) 102. Coupled to the LAN 102 are a plurality of personal computers designated PC-1, PC-2, PC-3, . . . PC-N, a printer 104 and a local file server 106. Also coupled to the LAN 102 is gateway 110, which may be, e.g., an ADSL (asymmetric digital subscriber loop) termination unit-receive (ATU-R) device, as described in ANSI standard T1.413, which is incorporated by reference herein.

The gateway 110 communicates via an ADSL link to a DSL access multiplexer (DSLAM) 112. The DSLAM 112 provides connections between the gateway 110 and a number of external networks, which in this illustrative embodiment includes a public switched telephone network (PSTN) 114, and an asynchronous transfer mode (ATM) network 116 which includes a remote access server (RAS) 118.

The conventional aspects of the operation of these devices are well understood in the art and therefore not described in detail herein. For example, additional details regarding the ATM communication aspects of the system 100 may be found in, e.g., ATM Forum, "ATM User-Network Interface Specification," Version 3.1, September, 1994, and in Martin de Prycker, "Asynchronous Transfer Mode Solution for Broadband ISDN," Ellis Horwood, N.Y., 1993, both of which are incorporated by reference herein.

As described previously, in a conventional gateway, an IP address disparity can arise between devices attached to the LAN 102, and can lead to direct communications between these devices nonetheless being routed through one or more of the external networks, e.g., network 114 or network 116. This is clearly undesirable in that it unnecessarily consumes network and gateway processing resources.

The present invention solves this significant problem of the prior art by implementing an address substitution mechanism in an otherwise conventional ATU-R or other gateway device. In accordance with the invention, gateway 110 is configured to intercept and store all address assignments issued by a remote network address server during an IP address assignment process, e.g. during a designated IP address exchange interval. The gateway 110 will then "trap" all incoming requests during, e.g., capabilities identification exchanges, and reissue the requests after evaluating and potentially adjusting the address fields thereof to a format suitable to each of the other devices on the LAN 102. Finally, at transport service time, the gateway 110 will receive individual message requests from devices on the LAN 102, map their addresses to appropriate substitution addresses, and reissue the messages with the altered addresses.

Figure 2:
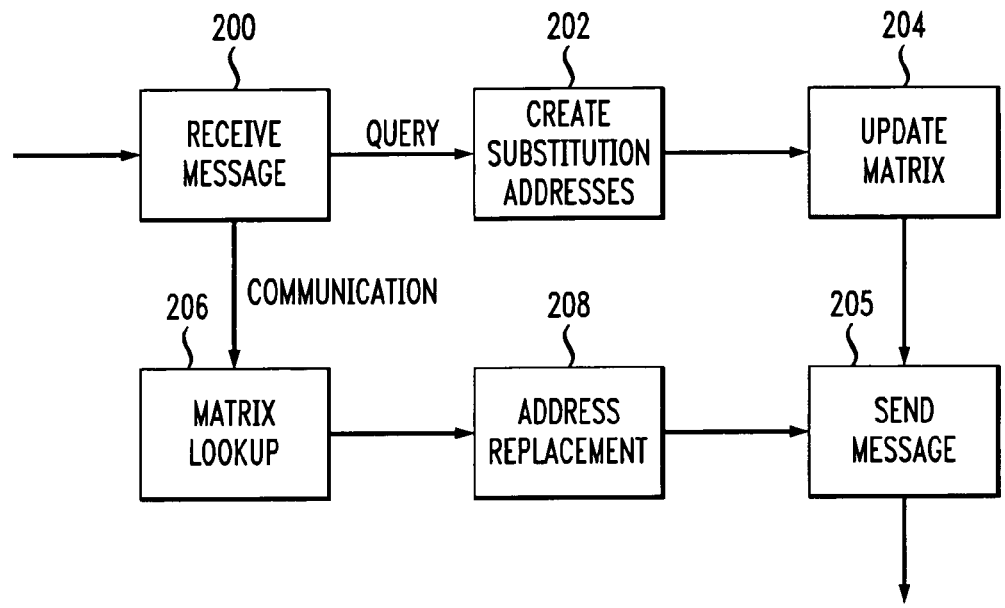
FIG. 2 is a flow diagram illustrating address substitution operations performed in a gateway device in the system of FIG. 1 in accordance with one possible embodiment of the invention.

FIG. 2 is a flow diagram of an address substitution process which is implemented in the gateway 110 in accordance with the invention. As previously noted, the gateway 110 monitors the LAN 102 for messages originating from devices on the LAN 102, e.g., one of the PCs PC-1, PC-2, . . . PC-N. In step 200, a message is received from a particular device on the LAN 102. The gateway then determines if the message is a query message or a communication message. An example of a suitable query message is a request for a so-called "Master Browser" which includes IP address information for the requesting device on the LAN 102. If the message is a query message, the gateway 110 in step 202 creates appropriate substitution addresses for the particular device, and in step 204 updates a matrix of substitution addresses to include the created substitution addresses for the particular device.

These stored substitution addresses comprise an address set in which each member of the set represents a subnetwork-compatible address for each device on the LAN 102 that has already registered its assigned IP address information in the above-described manner with the gateway 110. The gateway then explicitly exchanges addresses with each registered device on the LAN 102, and in step 205 sends the message in an otherwise conventional manner. If the message is a communication message, the gateway 110 in step 206 performs a lookup operation in the address substitution matrix, and in step 208 performs an address replacement. After completion of step 208, the gateway sends the message in step 205.

The following is a more specific example of the operation of the above-described address substitution feature of the gateway 110.

1. PC-1 broadcasts on LAN 102 a query message which includes its IP address information.

2. The gateway 110 receives the message, identifies it as a query message, stores the IP address information for PC-1, and creates a set of substitution addresses in the matrix for PC-1.

3. The gateway 110 then reports the address substitution information by unicasting the appropriate address information to each device on the LAN 102. More specifically, for each row of the address substitution matrix, the gateway 110 unicasts to each device a response which includes the corresponding address information for the device PC-1.

At transport service time, when the gateway 110 determines that a given device on the LAN 102 is transmitting a communication message to one of its substitution addresses, it intercepts the message, modifies the address to the actual address in accordance with the contents of the matrix, and forwards the message. In this manner, communication between devices on the LAN 102 can be implemented without routing the communications through the PSTN 114 or ATM network 116, despite the above-described IP address disparity that arises when a remote server is used to assign device IP addresses.

TABLE 1 below shows an example layout for the above-noted address substitution matrix. In this example, entries are shown for the first three PCs only, i.e., PC-1, PC-2 and PC-3, but additional entries could of course be added for other devices on the LAN 102 in a straightforward manner.

TABLE 1

Example Address Substitution Matrix Layout

|      | Gateway 110 | PC-1   | PC-2   | PC-3   |
| ---- | ----------- | ------ | ------ | ------ |
| PC-1 | C1-Gateway  | —      | C1-PC2 | C1-PC3 |
| PC-2 | C2-Gateway  | C2-PC1 | —      | C2-PC3 |
| PC-3 | C3-Gateway  | C3-PC1 | C3-PC2 | —      |

It should be noted that a given row in the address substitution matrix corresponds to a particular device on the LAN 102, and includes entries for the gateway 110 and for each of the other devices on the LAN 102 that have a corresponding row in the matrix. For example, the row for PC-1 includes entries for gateway 110, and the other two devices that are registered with gateway 110 and have entries in the matrix, i.e., PC-2 and PC-3. Similarly, the row for PC-2 includes entries for gateway 110, and the other two devices that are registered with gateway 110 and have entries in the matrix, i.e., PC-1 and PC-3. A given entry Ci-PCj in the row for the device PC-j designates an address that PC-i should use in communicating with PC-j. For example, PC-1 when communicating with PC-2 should use the address specified by the entry C1-PC2 in the address substitution matrix of TABLE 1.

TABLE 2 below shows an example matrix with typical entries. In this example, the actual addresses are as follows:

TABLE 2

Example Address Substitution Matrix Entries

| LAN Device | Address Substitution Information | | | |
|---|---|---|---|---|
| | Gateway 110 | PC-1 | PC-2 | PC-3 |
| PC-1 | 196.2.57.6 | — | 196.2.57.7 | 196.2.57.8 |
| PC-2 | 201.98.12.19 | 201.98.12.20 | — | 201.98.12.21 |
| PC-3 | 208.191.22.69 | 208.191.22.70 | 208.191.22.71 | — |

Gateway 110: 192.25.67.90
PC-1: 196.2.57.5
PC-2: 201.98.12.18
PC-3: 208.191.22.68

In the foregoing example, PC-1 when communicating with PC-2 should use the address 196.2.57.7 in the address substitution matrix of TABLE 2. Similarly, PC-3 when communicating with PC-2 should use the address 208.191.22.71. Address substitution information is determined in a similar manner for each of the devices on LAN 102 that have registered their IP address information with the gateway 110.

It is apparent from the above example that a given row of the address substitution matrix includes compatible sub-network address information for each of the devices on the LAN 102 that have registered with the gateway 110. For example, the row of the matrix created for PC-1 has IP addresses 196.2.57.6, 196.2.57.7 and 196.2.57.8 for the gateway 110, PC-2 and PC-3, respectively, and each of these substitution IP addresses is sub-network compatible with the corresponding stored IP address 196.2.57.5 which was assigned to PC-1 by a remote server. Use of the address substitution information in the address substitution matrix thus ensures that communications between registered devices on the LAN 102 will not be unnecessarily routed through an external network such as PSTN 114 or ATM network 116.

Figure 3:
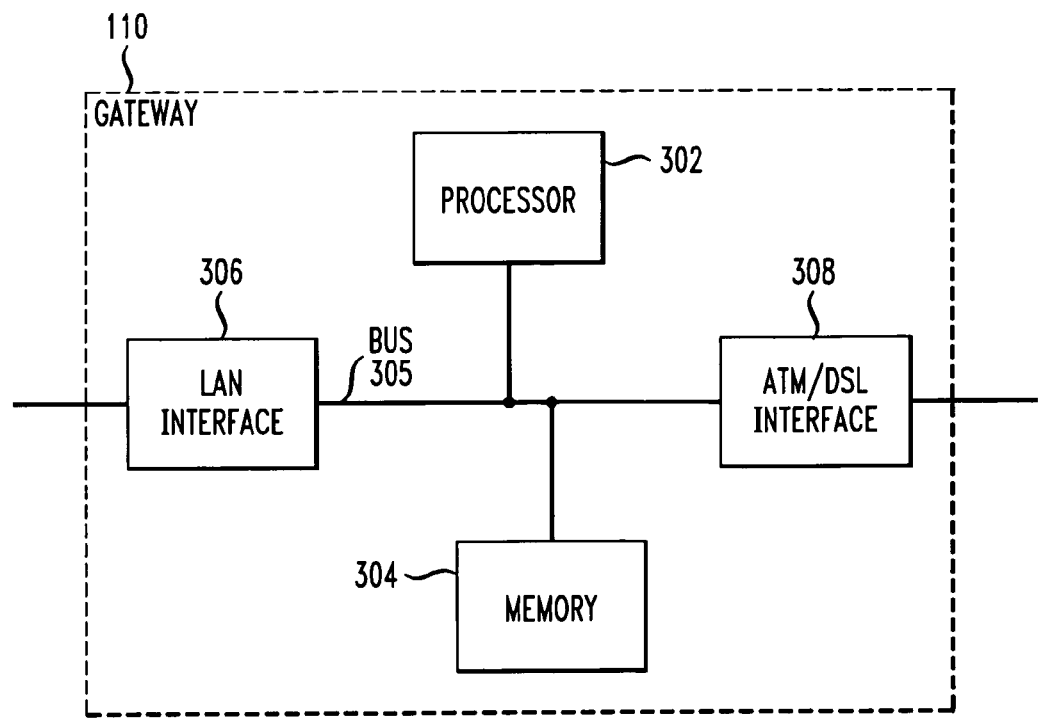
FIG. 3 is a block diagram of an exemplary implementation of the gateway of FIG. 1.

FIG. 3 is a block diagram illustrating a possible implementation of the gateway 110 in accordance with the invention. The gateway 110 in this implementation is a processor-based device and includes a processor 302 and a memory 304 which are configured to communicate over a bus 305. The gateway 110 further includes a LAN interface 306 for interfacing with the LAN 102 of system 100, and an ATM/DSL interface 308 for interfacing with the PSTN 114 and ATM network 116 via the DSLAM 112. The processor 302 may represent, e.g., a microprocessor, a central processing unit, a microcontroller, an application-specific integrated circuit (ASIC), a computer or other digital data processor, as well as portions or combinations of these and other processing devices. The memory 304 may represent, e.g., an electronic memory, a magnetic or optical disk-based memory, or other suitable storage device, as well as portions or combinations of such storage devices.

The address substitution operations described in conjunction with FIG. 2 may be implemented as one or more software programs stored in memory 304 and executed by processor 302. The memory 304 may be used to store the address substitution matrices described above and illustrated in TABLES 1 and 2.

It should be noted that a gateway of the type described above may be configured to provide a number of other processing operations. For example, a gateway may be configured to intercept control information and/or maintenance information sent over a network for delivery to a particular device, and may perform related control and/or maintenance services on behalf of the particular device.

It will be recognized that many alternative configurations are possible for system 100 and gateway 110, e.g., using elements other than those shown in FIGS. 1 and 3, and it should be understood that the invention is not restricted to use with any particular system configuration. Moreover, the invention can be implemented in whole or in part in software stored on a machine-readable medium, e.g., an optical or magnetic disk, a disk-based storage device, an electronic memory, etc., and executed by a processor associated with a gateway or other similar element of a communication system.

The above-described embodiments of the invention are intended to be illustrative only. Numerous alternative embodiments within the scope of the following claims will be apparent to those skilled in the art.

What is claimed is:

1. An apparatus for use in interfacing a local network to one or more external network elements, the apparatus comprising:
a gateway coupled between the local network and the one or more external network elements, the gateway being operative to determine remotely-assigned address information for a given device attached to the local network; and to establish, based at least in part on the remotely-assigned address information, a substitution address for use by at least one other device attached to the local network when communicating with the given device.

2. The apparatus of claim 1 wherein the remotely-assigned address information comprises an Internet protocol (IP) address assigned to the given device by an external network element.

3. The apparatus of claim 1 wherein the local network comprises a local area network (LAN).

4. The apparatus of claim 1 wherein the gateway comprises an ADSL (asymmetric digital subscriber loop) termination unit-receive (ATU-R) device.

5. The apparatus of claim 1 wherein the gateway stores remotely-assigned address information for each of a plurality of devices attached to the local network.

6. The apparatus of claim 5 wherein the gateway stores a set of address substitution information for each of the plurality of devices, the set of address substitution information for a given one of the devices comprising an address to be used by the given device in communicating with the gateway, and addresses to be used by the given device in communicating with each of the other devices.

7. The apparatus of claim 6 wherein the stored information comprises an address substitution matrix having a row of address information for each of the plurality of devices attached to the local network.

8. The apparatus of claim 6 wherein a given one of the sets of address substitution information for a particular one of the plurality of devices comprises a set of IP addresses, each of which is sub-network compatible with an IP address remotely assigned to the corresponding device, such that communications between the given device and another one of the devices attached to the local network are not routed through an external network element.

9. The apparatus of claim 1 wherein the gateway processes a particular received packet in order to replace remotely-assigned address information in a header thereof with a corresponding substitution address determined by the gateway.

10. The apparatus of claim 1 wherein the gateway intercepts at least one of control information and maintenance information received over the local network and associated with the given device so as to perform related services on behalf of the given device.

11. A method for use in interfacing a local network to one or more external network elements, the method comprising the steps of:

determining, in a gateway coupled between the local network and the one or more external network elements, remotely-assigned address information for a given device attached to the local network; and establishing a substitution address for use by at least one other device attached to the local network when communicating with the given device, based at least in part on the remotely-assigned address information.

12. The method of claim 11 wherein the remotely-assigned address information comprises an Internet protocol (IP) address assigned to the given device by an external network element.

13. The method of claim 11 wherein the local network comprises a local area network (LAN).

14. The method of claim 11 wherein the gateway comprises an ADSL (asymmetric digital subscriber loop) termination unit-receive (ATU-R) device.

15. The method of claim 11 wherein the gateway stores remotely-assigned address information for each of a plurality of devices attached to the local network.

16. The method of claim 15 wherein the gateway stores a set of address substitution information for each of the plurality of devices, the set of address substitution information for a given one of the devices comprising an address to be used by the given device in communicating with the gateway, and addresses to be used by the given device in communicating with each of the other devices.

17. The method of claim 16 wherein the stored information comprises an address substitution matrix having a row of address information for each of the plurality of devices attached to the local network.

18. The method of claim 16 wherein a given one of the sets of address substitution information for a particular one of the plurality of devices comprises a set of IP addresses, each of which is sub-network compatible with an IP address remotely assigned to the corresponding device, such that communications between the given device and another one of the devices attached to the local network are not routed through an external network element.

19. The method of claim 11 wherein the gateway processes a particular received packet in order to replace remotely-assigned address information in a header thereof with a corresponding substitution address determined by the gateway.

20. The method of claim 11 wherein the gateway intercepts at least one of control information and maintenance information received over the local network and associated with the given device so as to perform related services on behalf of the given device.

21. A machine-readable medium storing one or more programs for use in interfacing a local network to one or more external network elements, wherein the one or more programs when executed by a processor implement the steps of:

determining, in a gateway coupled between the local network and the one or more external network elements, remotely-assigned address information for a given device attached to the local network; and establishing a substitution address for use by at least one other device attached to the local network when communicating with the given device, based at least in part on the remotely-assigned address information.

* * * * *